United States Patent [19]
Schaefer

[11] Patent Number: 5,807,414
[45] Date of Patent: Sep. 15, 1998

[54] CLEAN AIR WORK STATION

[75] Inventor: Richard F. Schaefer, Fort Lupton, Colo.

[73] Assignee: Sportsman Manufacturing Company, Commerce City, Colo.

[21] Appl. No.: 840,971

[22] Filed: Apr. 21, 1997

Related U.S. Application Data

[60] Provisional application No. 60/016,059, Apr. 23, 1996.

[51] Int. Cl.$^6$ .................................................... B23K 7/08
[52] U.S. Cl. ............................ 55/385.2; 55/473; 55/481; 55/DIG. 18
[58] Field of Search ................................. 55/385.2, 471, 55/472, 473, 481, DIG. 18, DIG. 29

[56] References Cited

U.S. PATENT DOCUMENTS

| | | | |
|---|---|---|---|
| 3,318,076 | 5/1967 | Baker | 55/DIG. 18 |
| 3,944,405 | 3/1976 | van Calsteren . | |
| 4,016,809 | 4/1977 | Austin | 55/DIG. 18 |
| 4,202,676 | 5/1980 | Pelosi, Jr. et al. . | |
| 4,268,282 | 5/1981 | MacKenzie | 55/DIG. 18 |
| 4,287,405 | 9/1981 | Ohmae et al. . | |
| 4,333,745 | 6/1982 | Zeanwick | 55/385.2 |
| 4,595,368 | 6/1986 | Cole . | |
| 4,606,260 | 8/1986 | Cox . | |
| 4,832,717 | 5/1989 | Peters | 55/DIG. 18 |
| 4,860,643 | 8/1989 | Spearow . | |
| 5,097,750 | 3/1992 | Oldham et al. . | |
| 5,257,957 | 11/1993 | Diccianni et al. . | |
| 5,318,473 | 6/1994 | Goemans et al. . | |
| 5,410,120 | 4/1995 | Taylor . | |
| 5,487,768 | 1/1996 | Zytka et al. | 55/DIG. 18 |
| 5,511,764 | 4/1996 | Wonsetler | 55/DIG. 18 |

OTHER PUBLICATIONS

Dustvent—Downdraft Work Stations.
Airflow Systems Inc., Dust–Pak®, Model DT–3000.
AerTABLES™ Designed For Use With Remote Dust/Fume Collection System., 1994 Aercology, Inc.

*Primary Examiner*—Jay H. Woo
*Assistant Examiner*—Minh-Chau T. Pham
*Attorney, Agent, or Firm*—Rick Martin

[57] ABSTRACT

A workbench suited for welding, grinding, and polishing operations features a multi-panel table top. The panels each have a high number of perforations to allow a high rate of air flow at a relatively low noise level. An optional backwall or a booth can be mounted atop the tabletop. Each also has perforations to collect dust from the air flow.

18 Claims, 5 Drawing Sheets

CLEAN AIR WORK STATION

CROSS-REFERENCE TO RELATED APPLICATION

This application is a non-provisional application claiming the benefits of provisional application no. 60/016,059, filed Apr. 23, 1996.

FIELD OF INVENTION

The present invention relates to a modular work bench and booth assembly having a perforated table top and booth grating. A self-contained fan and filter draws workbench dust into a filter. A high density of perforations keeps the noise level low.

BACKGROUND OF THE INVENTION

Workbench projects including welding, grinding, and sanding produce high amounts of dust. Known in the art are workbench assemblies which address removing the dust from the air.

Dustvent™ manufactures a workbench having a plurality of slots on the table top which form a grate similar to a charcoal cooking grill. Tools can fall through the slots. Noise is created by the 1400 C.F.M. cleaning airflow. An external central air filtration system must be built adding to costs and taking up floor space.

Airflow Systems, Inc.™ manufactures a self-contained 200 FPM downdraft workbench. It is built as a massive non-modular unit. Large slots on the table top form a grill. But tools can fall through. Air noise is considerable. The sidewalls and backwall are too short, thus allowing dust to fly off the workbench.

Aercology™ manufactures a downdraft air velocity workbench having large slots on the table top into which tools could fall. An external air filtration system is required. A good sized backwall and hinged side-wing panels capture the dust.

A summary of patented prior art is noted below.

U.S. Pat. No. 3,944,705 (1976) to van Calsteren discloses a laminar down-flow chamber having a ceiling and room and a workbench having an exhaust grid.

U.S. Pat. No. 4,202,676 (1980) to Pelosi, Jr. et al. discloses a portable clean room for an animal or plant under observation.

U.S. Pat. No. 4,287,405 (1981) to Ohmee et al. discloses a suction hood for a welding device.

U.S. Pat. No. 4,595,368 (1986) Cole discloses an underwater welding training tank.

U.S. Pat. No. 4,606,260 (1986) to Cox discloses a welding station exhaust hood and a pair of legs support the exhaust hood.

U.S. Pat. No. 4,860,643 to Spearow discloses a laminer flow clean room workbench having bench-top ducts and rear wall ducts.

U.S. Pat. No. 5,096,650 (1992) to Oldham, deceased et al. discloses a garbage bin having a rear wall exhaust duct.

U.S. Pat. No. 5,257,957 (1993) to Doccianni et al. discloses a safety enclosure work container.

U.S. Pat. No. 5,318,473 (1994) to Goemans et al. discloses a fume hood having back wall outlets.

U.S. Pat. No. 5,410,120 (1995) to Taylor discloses a welding room having a downward laminar flow air vent system.

In summary the present invention provides a good-sized backwall and hinged side panels on a self-contained downdraft air velocity workbench. A minimum of 250 perforations per square foot having a maximum opening size of 0.5 square inches each provide for high 1200 C.F.M. flow and a low 68 dB noise. The modular construction allows a work booth to be added to the top. The work booth also has a perforated backwall. The modular table top provides for a 500 pound capacity in a relatively lightweight workbench.

SUMMARY OF THE INVENTION

The main object of the present invention is to provide a workbench having a high throughput draw and relatively low noise level.

Another object of the present invention is to provide a self-contained air filtration system in the workbench.

Another object of the present invention is to provide a modular construction enabling a work booth to be added to the top.

Other objects of this invention will appear from the following description and appended claims, reference being made to the accompanying drawings forming a part of this specification wherein like reference characters designate corresponding parts in the several views.

Both the workbench and booth embodiments of the present invention are used for welding, grinding, and polishing. They create a clean environment for the operators. They use a "DualDraw™" system to gently pull fumes, dust, and smoke out the back and bottom of the booth.

"DualDraw™" has an exclusive perforated table top which draws air evenly through 2500 or more openings. Systems that vent from the top pull smoke and dust past the worker's face, but the "DualDraw™" system draws it back and down away from the operator.

Other systems that pull only from the bottom are not effective when working on parts that sit high above the table. The "DualDraw™" booth eliminates this problem because fumes and dust are drawn out the back of the booth as well.

The downdraft work table has no back or sides in order to accommodate larger items. The bottom draw pulls air away from the operator. A downdraft back panel is available to contain sparks and dust when using the table for grinding. Hinged side wings are also available.

Two options are available for filtering. They are

First, the "Filter System" has dual pleated-panel filters with over 140 square feet of filter area and 95%+ efficiency. This filter offers significantly higher efficiencies, longer life, and better dust-holding capacities than conventional filters.

Second, the "Dust Collector System" is used for polishing and grinding. The bag filters out smaller particles while large particles are collected in a container for easy disposal.

| Specifications | Table | Booth | Filter System | Dust Collector |
|---|---|---|---|---|
| Power Requirement | 110 VAC, 8.6 A | 110 VAC, 10.7 A | N/A | N/A |
| Air Flow Rate | 1200 CFM. | 1200 CFM. | 2000 CFM max. | N/A |
| Sound Level | 68 dB | 68 dB | N/A | N/A |
| Dimensions | L. 48", W. 30", H. 58" | L. 48", W. 30", H. 80" | L. 30", W. 10", H. 24" | H 60", DIA 24" |
| Weight | 232 lb. | 340 lb. | 45 lb. | 30 lb. |

Booth Features
  The table top and the back of the booth were designed with thousands of small openings over the entire surface. These openings enable the filter system to remove welding smoke, fumes and small particles from around the worker.
  A 110V side outlet comes with the table along with a 36" florescent safety light attached to the top of the booth.
  Due to the thousands of small openings there are no areas of high velocity air flow that create loud noise levels.
  DualDraw's™ unique design prevents any and all tooling from dropping through the table top.
  DualDraw™ was designed from the ground up using heavy gage sheet metal so that the entire unit can be manufactured with high-speed computerized equipment. This lowers manufacturing costs and allows the units to be shipped partially assembled in smaller crates to reduce shipping costs.
Blower Features
  Achieves the correct balance between proper air flow and quiet operation with low power consumption (less than 11 amps with a sound level of 68 dB).
  The blower allows correct balance between proper air flow and quiet operation without disrupting welding gas flow.
  The blower has automatic thermal protection and will shut off if it overheats.
Filter Features
  Self-contained air filtration system allows DualDraw™ to be placed anywhere without expensive duct systems and can be moved anywhere to accommodate efficient plant layout for different production needs.
  Dual filtration system for welding has 140 square feet of filter area in one third the space of conventional filters.
  Low-cost pre-filter to extend the life of the final filter by 600-percent.
  Optional bag filter system allows DualDraw™ to be used for grinding, polishing, and buffing operations.
Operator Benefits
  Comfortable work height and table size to reduce operator fatigue.
  Knee room for sitting at booth.
  Rounded edges on operator's side.
  Low noise level.
  Good lighting.
  Extra electrical outlets.
  High-strength unibody design (500 lb. load rate).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
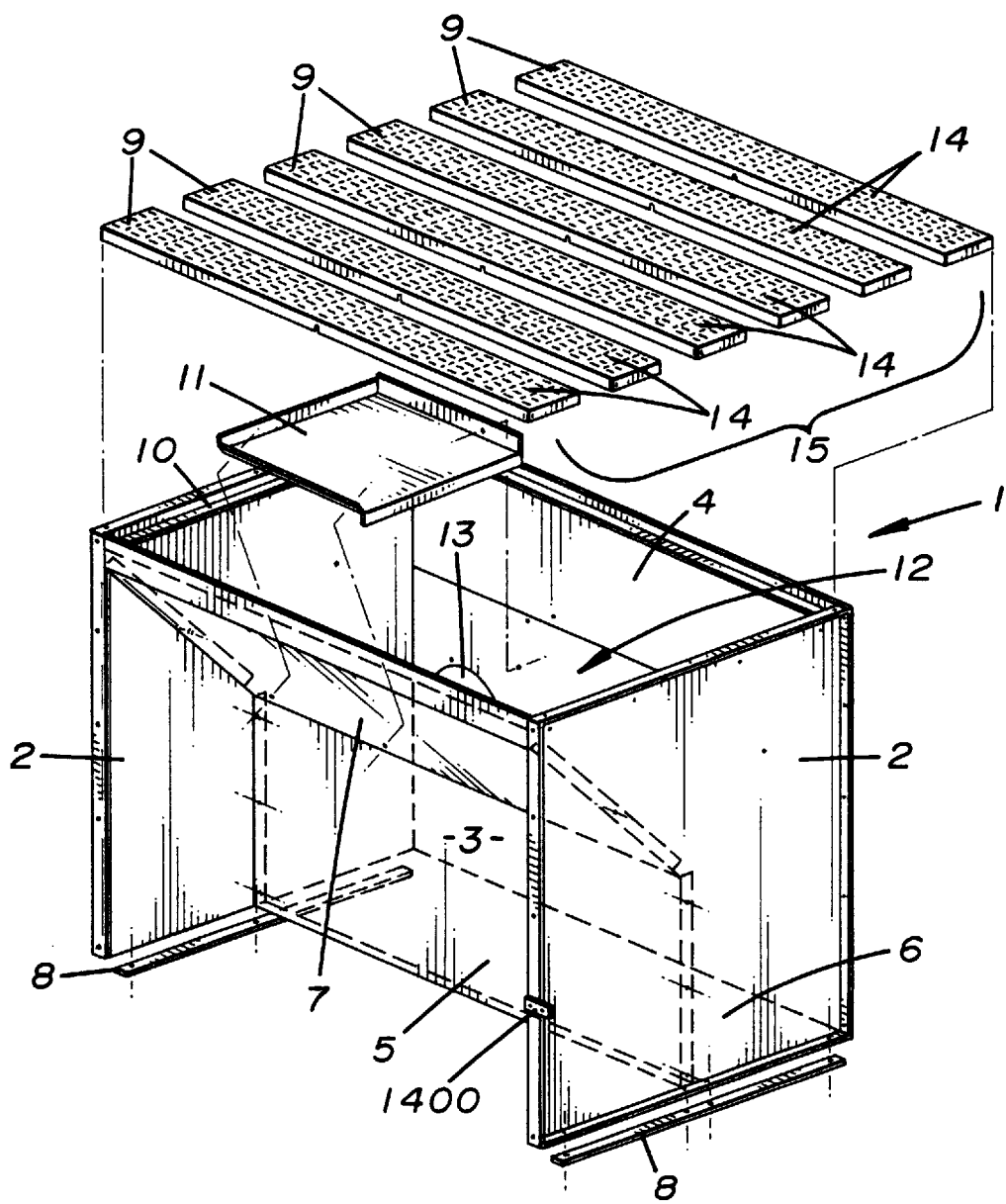
FIG. 1 is a top perspective partially exploded view of the preferred embodiment of the workbench.

Referring first to FIG. 1 the preferred embodiment of the workbench is designated as 1. Sides 2 are vertical and planar and form a U-shape support with upper back member 4 and lower back member 3. Table top 15 is supported by ledge 10 which runs along the top portion of members 2, 4, 2. Stiffener brackets 8 give added support strength to sides 2. A vacuum chamber 12 is created by upper front panel 7, lower front panel 5, sides 2, bottom 6, back members 3, 4 and table top 15. A baffle 11 maintains approximately even air flow through slots 14 into intake hole 13 and also lowers the noise level. Table top 15 is comprised of preferably six panels 9 which results in the strength to support nominally 500 pounds. Individual panels 9 also facilitate modular replacement of damaged panels rather than an entire new table top. Grounding bracket 1400 is wired to ground.

Critical to the performance of the workbench 1 is the size and numerosity of the slots 14. There are a minimum of 250 slots per square foot. Each slot 14 is equal to or less than 0.5 square inch. This configuration yields a noise level of 50–75 dB at about 1200 C.F.M. (200 feet per minute) air flow through slots 14. Some configurations have up to 20,000 slots each as small as 0.00001 square inch.

Figure 2:
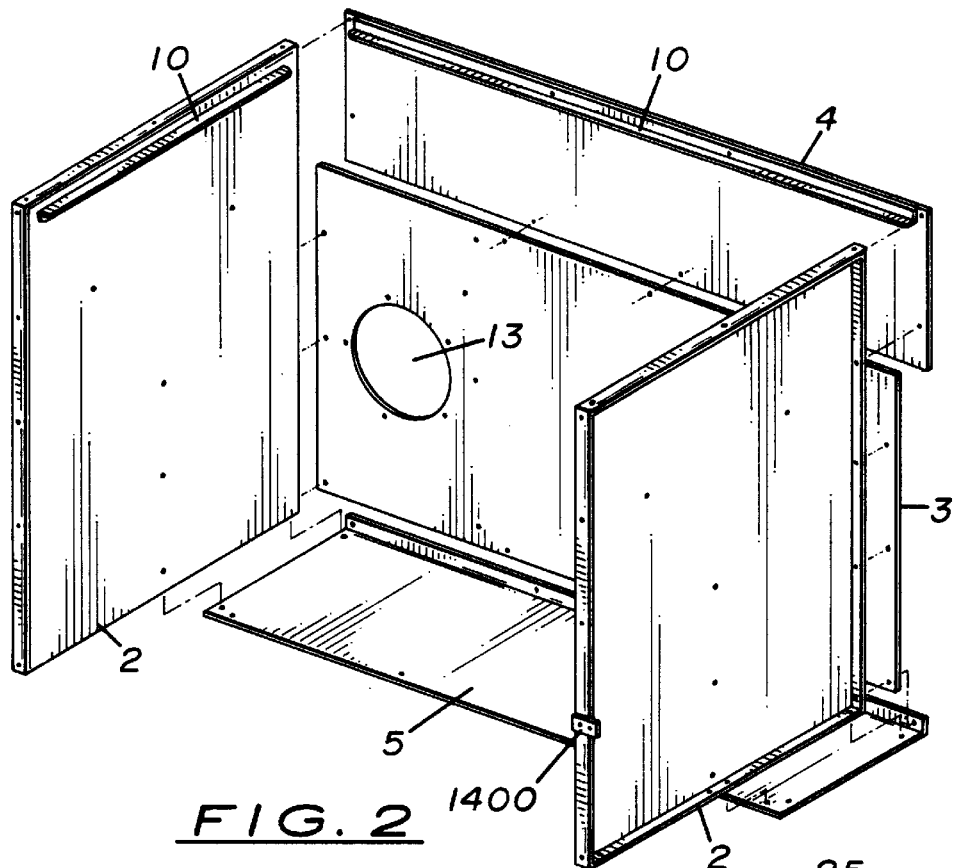
FIG. 2 is an exploded view of the workbench shown in FIG. 1 without the table top and front.

FIG. 2 shows the key elements of the U-shaped support in exploded view. The unit is modular, low-cost, and light weight (about 232 pounds).

Figure 3:
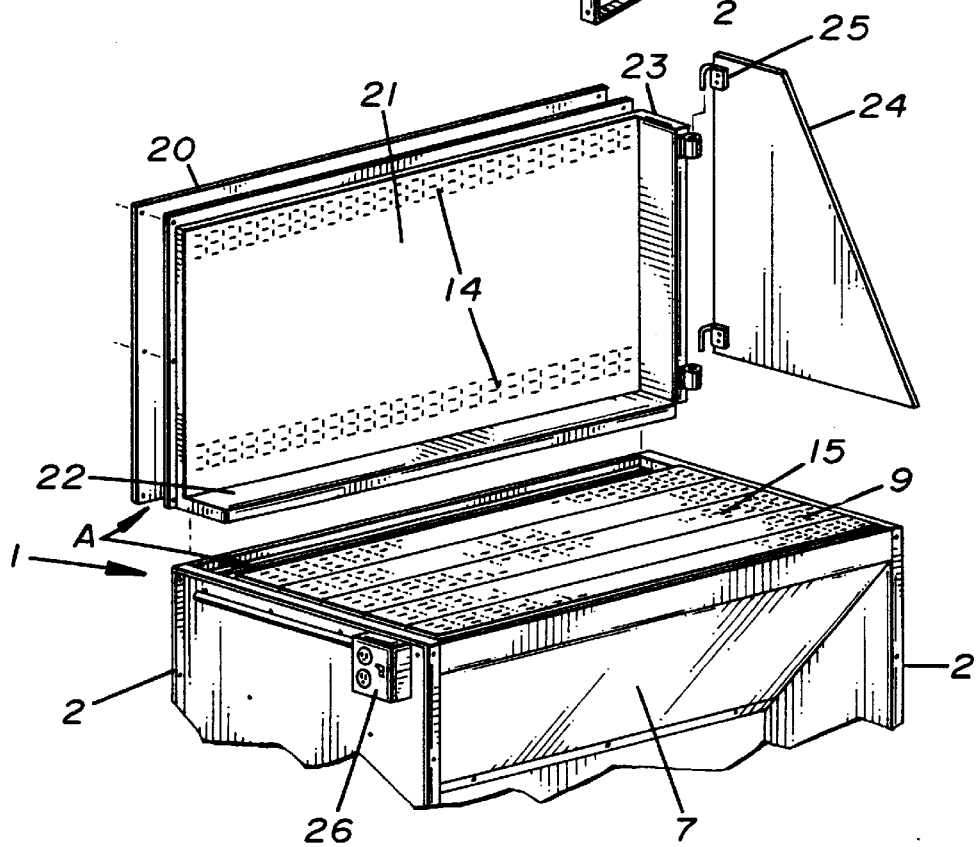
FIG. 3 is a top perspective partially exploded view of a table top having the optional backwall and hinged side wings.

FIG. 3 shows an optional backwall 20 having an inside back grate 21 with slots 14 in a similar configuration as in panels 9. Wing supports 23 support wings 24 with hinges 25. Back bottom 22 replaced one panel 9 for support. An air channel A allows air to enter the inside back grate 21 and flow to vacuum chamber 12 and exit hole 13. A switch 26 controls the blower 32.

Figure 4:
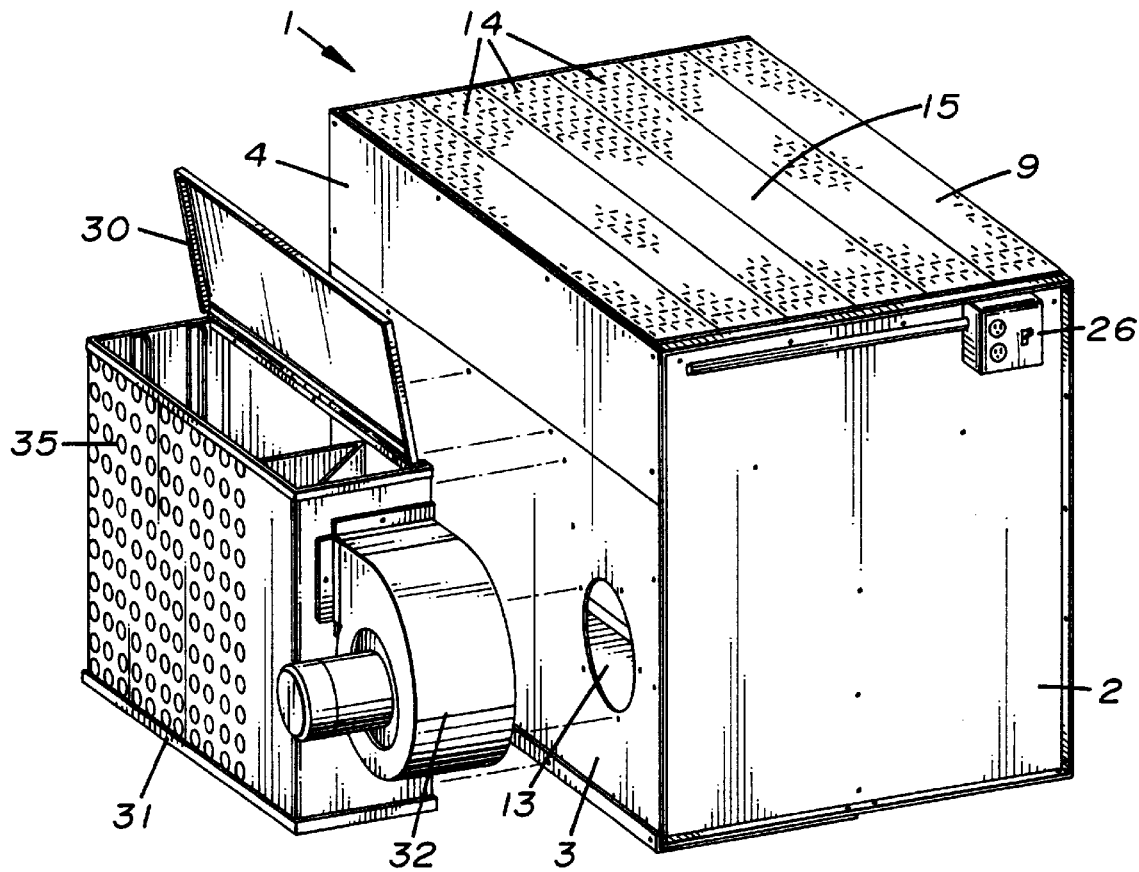
FIG. 4 is a rear perspective partially exploded view of the workbench shown in FIG. 1 depicting the air filtration system.

Referring next to FIG. 4 the blower 32 pulls air through the slots 14 of table top 15 and through hole 13 and out the exit holes 35 of filter housing 31.

Figure 5:
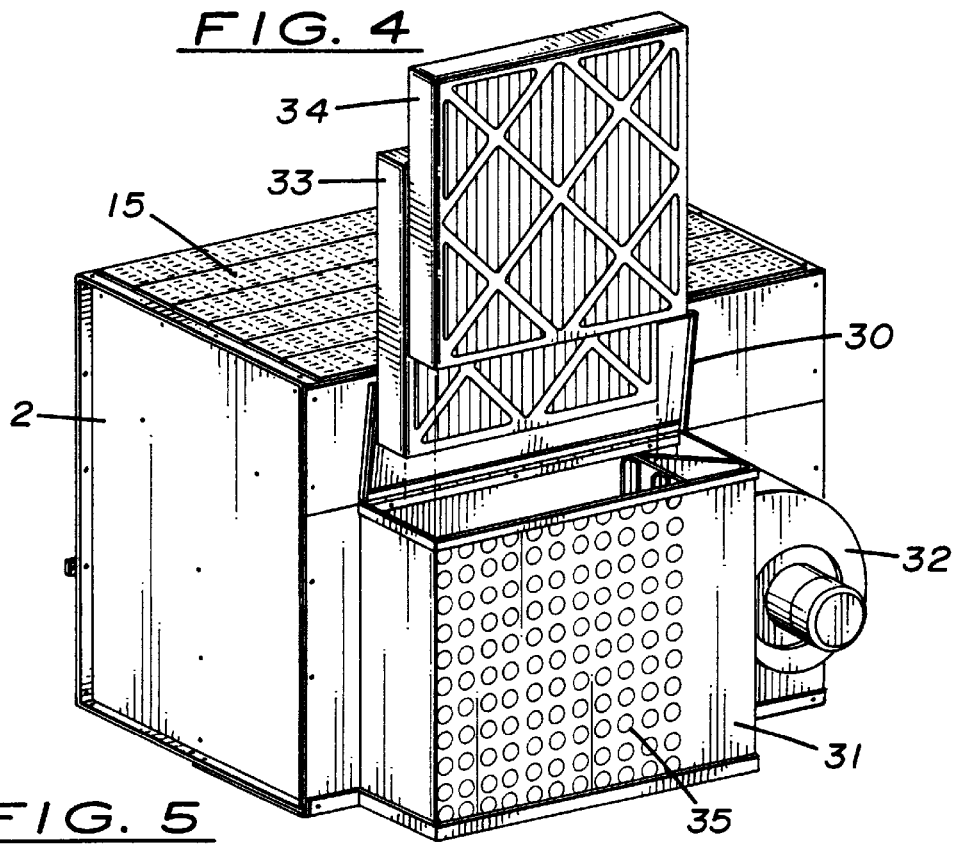
FIG. 5 is a rear perspective partially exploded view of the workbench shown in FIG. 4 showing the two air filters.

FIG. 5 shows the lid 30 open and the pre-filter 33 and final filter 34 ready to install in the filter housing 31.

Figure 6:
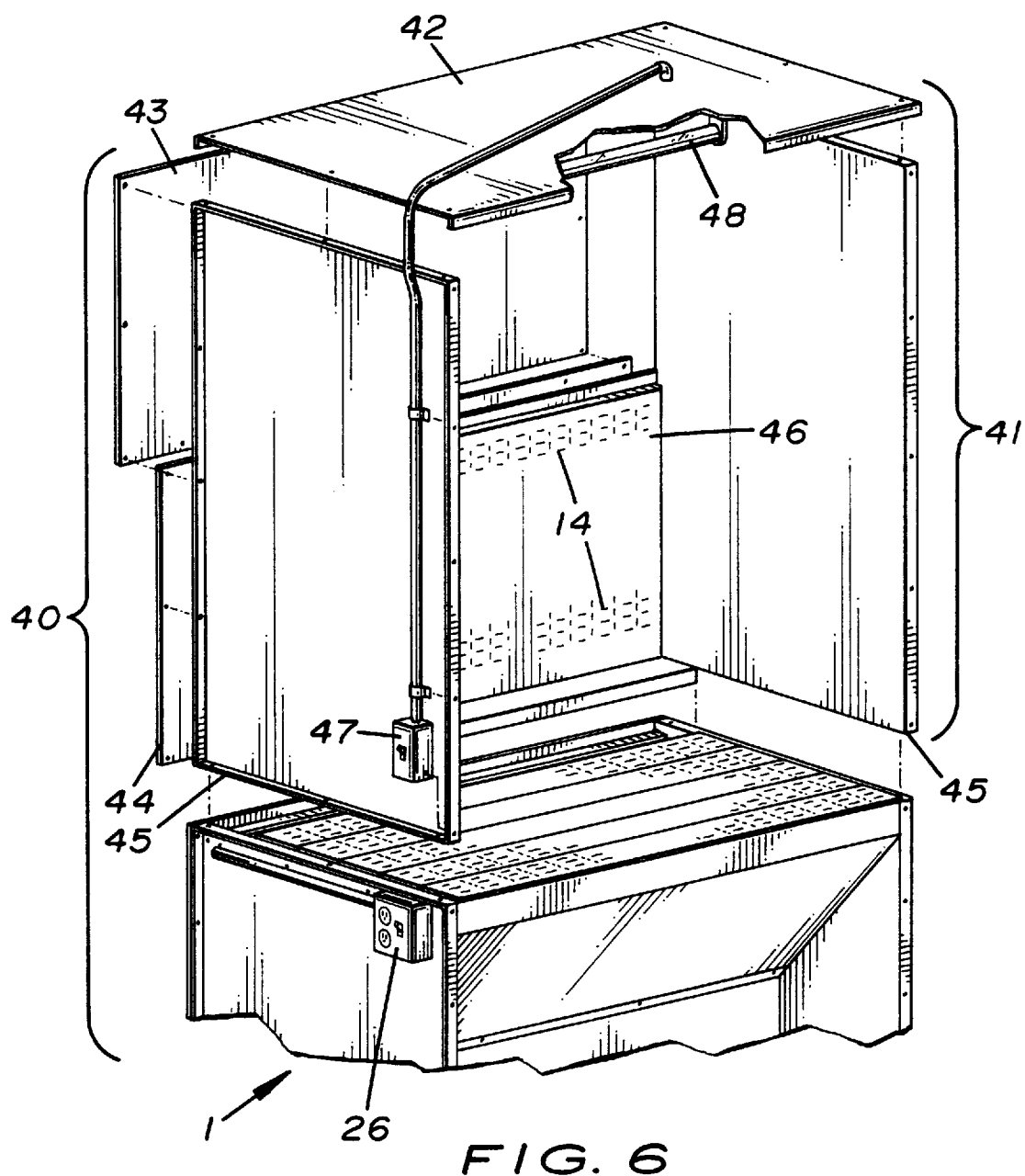
FIG. 6 is a top perspective partially exploded view of an optional booth assembly mounted atop the workbench shown in FIG. 1.

For certain projects, it is desirable to have a booth 40 as shown in FIG. 6. Workbench 1 is the same as shown in FIG. 1. A booth module 41 is installed atop the workbench 1. Sides 45 and top back 43 and back bottom 44 comprise a U-shape to rest upon the U-shape of the workbench top 15. The inside back grate 46 has the same slots 14 and configuration as the backwall 20. The top 42 has a light 48 controlled by switch 47.

Figure 7:
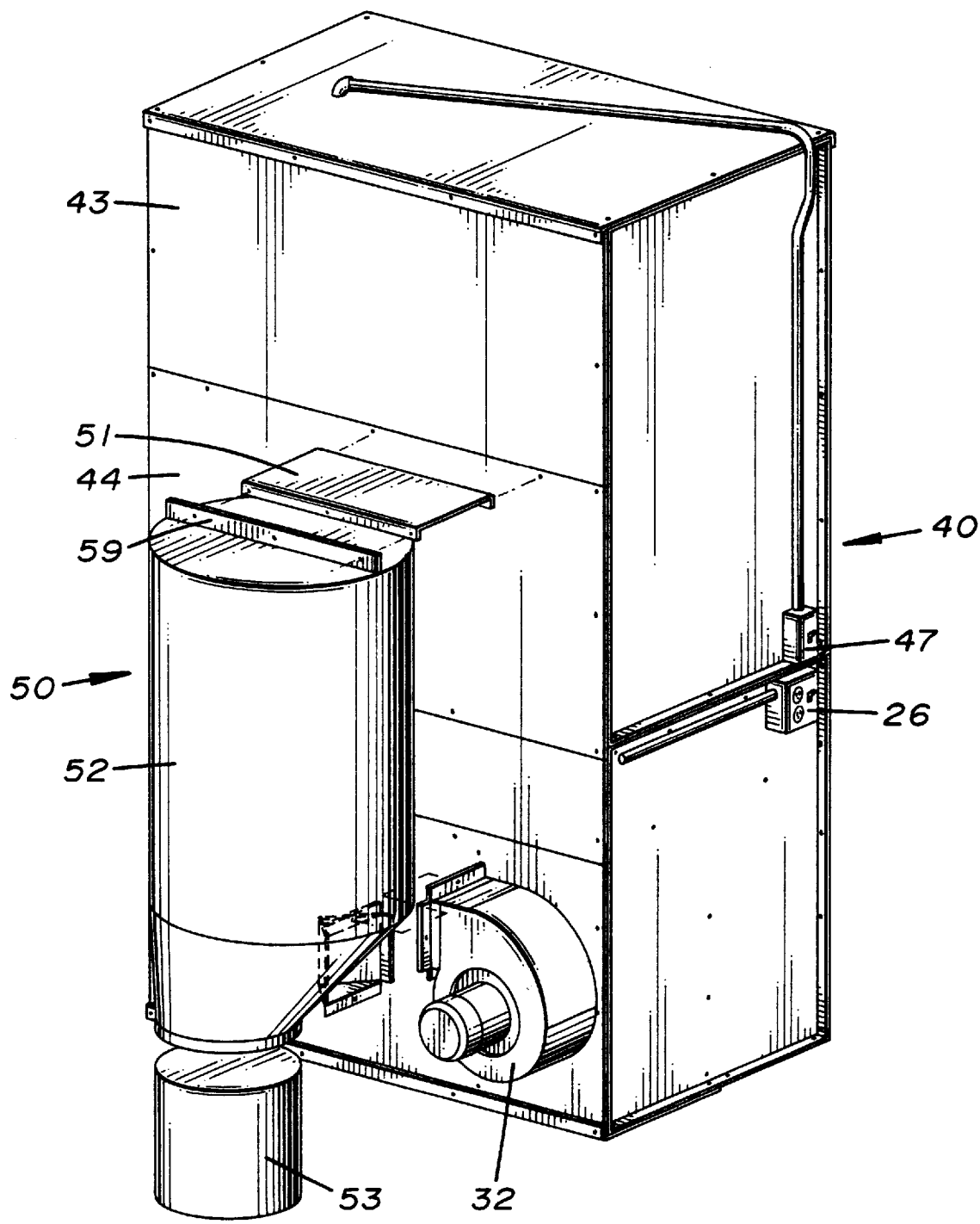
FIG. 7 is a rear perspective view of the booth embodiment shown in FIG. 6 and having an optional dust collector air filtration system.

Referring last to FIG. 7 the dust collector 50 comprises a back hanger 51 mounted to the back bottom 44. Filter bag 52 hangs from the back hanger 51 by means of bracket 59. Bucket 53 captures dust from the output of blower 32. The dust collector 50 enables polishing and grinding applications. The bag 52 filters out smaller dust particles while the larger dust particles settle in the bucket 53.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A workbench for providing clean air in a workplace, said workbench comprising:
   a workbench top supported by a left side panel, a right side panel and a back panel;
   a vacuum chamber defined by said left and right side panels, said back panel, and a front panel;
   said workbench top having a plurality of openings of equal to or less than 0.5 square inch each;
   said openings forming a density of at least 250 openings per square foot on the workbench top; and
   a blower and filter combination connected to said vacuum chamber to remove air from the vacuum chamber via the openings, thereby producing a low noise level of less than 75 dB at about 1200 C.F.M.

2. The workbench of claim 1, wherein the workbench top further comprises a plurality of panels.

3. The workbench of claim 1 further comprising a baffle underneath the workbench top to provide an even air flow through the openings.

4. The workbench of claim 1, wherein the openings are slots.

5. The workbench of claim 1, wherein the blower and filter combination is attached to the back panel.

6. The workbench of claim 1 further comprising a back wall having an inside back grate with ventilation openings connected to the vacuum chamber.

7. The workbench of claim 6 further comprising support wings.

8. The workbench of claim 1 further comprising a booth module mounted atop the workbench, said booth module having a left side, a right side, a roof, and a back panel, said back panel having an inside back grate with ventilation openings connected to the vacuum chamber.

9. The workbench of claim 8, wherein said roof has a light.

10. The workbench of claim 8, wherein the blower and filter combination further comprise a filter bag connected to the back panel to collect dust.

11. A self-contained air cleaning workbench comprising:
    a U-shaped support base having sides and a back member;
    a vacuum chamber defined by a front panel and the U-shaped support base;
    a workbench top having a plurality of openings, each opening having an area of equal to or less than 0.5 square inch;
    said plurality of openings having a density of at least 250 openings per square foot; and
    a blower and filter combination evacuating the vacuum chamber and attached to said back member to provide a low noise level of under 75 dB at about 1200 C.F.M.

12. The workbench of claim 11, wherein the workbench top further comprises a plurality of panels.

13. The workbench of claim 12, wherein the openings are slots.

14. The workbench of claim 13, wherein the workbench top further comprises a back panel having an inside grate with ventilation openings connected to the vacuum chamber.

15. The workbench of claim 13 further comprising a booth module mounted atop the workbench top, said booth module having a back panel with an inside grate having ventilation openings connected to the vacuum chamber.

16. A workbench comprising:
    a support chassis supporting a workbench top that forms a vacuum chamber;
    said workbench top having a plurality of small ventilation opening means functioning to prevent tools from falling therein and to allow air to pass through the opening means at about 1200 C.F.M. at a low noise, wherein said vacuum chamber is evacuated by a blower.

17. The workbench of claim 16, wherein the blower is connected to the support chassis and has a filter.

18. The workbench of claim 17, wherein the workbench top further comprises a plurality of panels.

* * * * *